July 2, 1957 A. A. HOOK 2,797,632
GRAIN STORAGE BIN VENTILATOR
Filed May 18, 1954 2 Sheets-Sheet 1
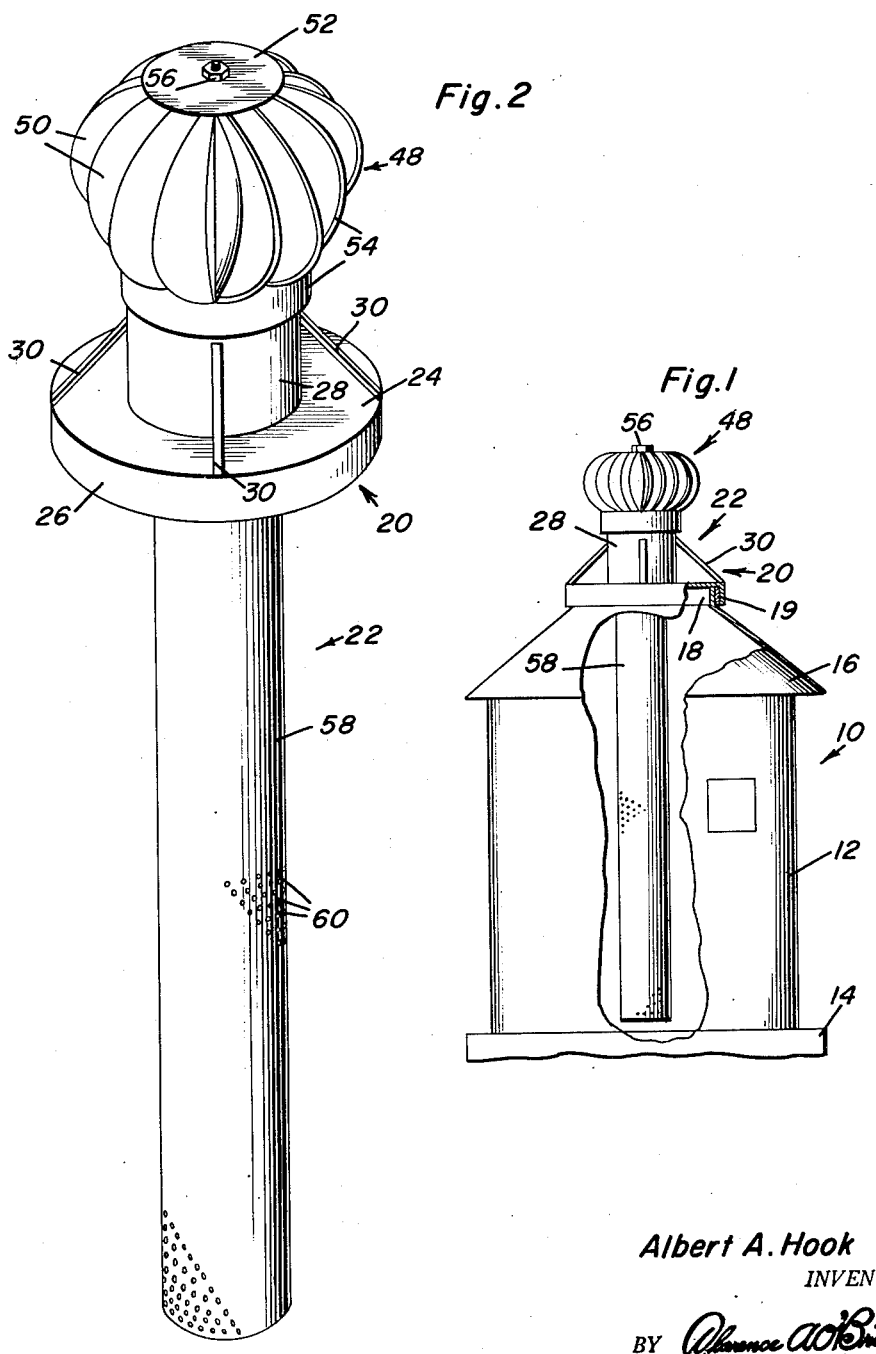
Albert A. Hook
INVENTOR.

July 2, 1957 A. A. HOOK 2,797,632
GRAIN STORAGE BIN VENTILATOR
Filed May 18, 1954 2 Sheets-Sheet 2
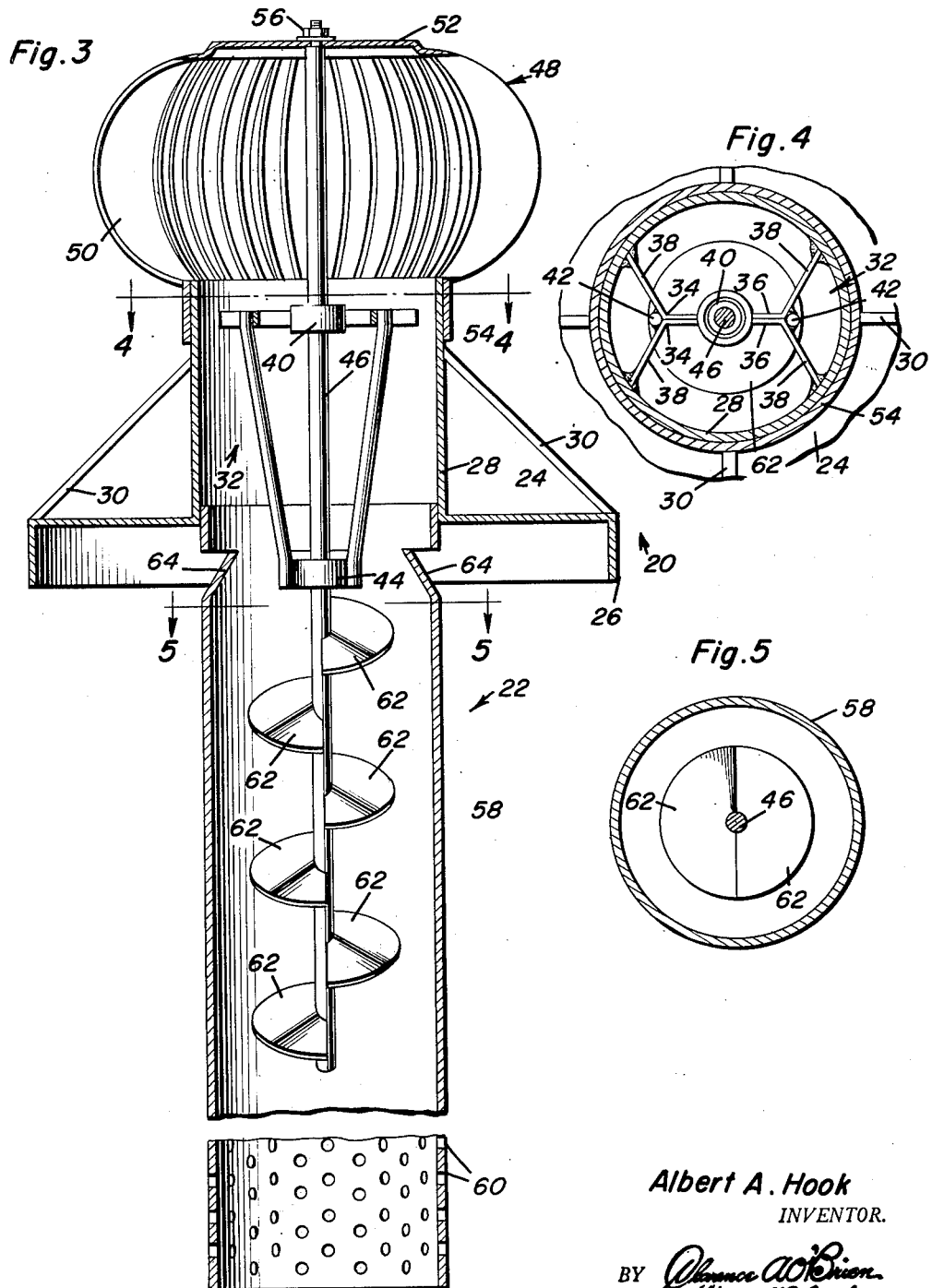
Albert A. Hook
INVENTOR.

United States Patent Office 2,797,632
Patented July 2, 1957

2,797,632
GRAIN STORAGE BIN VENTILATOR

Albert A. Hook, Wapello, Iowa, assignor of one-third to Robert K. Campbell, Oakville, Iowa Application May 18, 1954, Serial No. 430,599

1 Claim. (Cl. 98—55)

This invention relates in general to improvements in ventilating apparatus, and more specifically to a grain storage bin ventilator.

In order that grain stored in bins may be retained in proper position and prevented from spoiling, it is necessary that the grain be thoroughly ventilated. While there has been devised various types of ventilators, including mechanical fans and blowers, nearly all proposed ventilators have defects of one nature or the other. For example, in mechanical ventilators, it is necessary to control the operation thereof and also there is an expense involved.

It is therefore the primary object of this invention to provide an improved grain storage bin ventilator which is automatic in operation and which is so constructed whereby it requires no attention whatsoever.

Another object of this invention is to provide an improved grain storage bin ventilator which is so constructed and arranged whereby it may be utilized in any of the existing round type grain storage bins.

Another object of this invention is to provide an improved grain strorage bin ventilator which is of an extremely simple construction and which is formed of readily obtainable materials so that the initial cost thereof is relatively low and therefore economically feasible.

A further object of this invention is to provide a ventilator for grain storage bins, the ventilator including a wind turbine and accordingly being wind powered so as to have no operating cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a conventional round type grain storage bin and shows the same provided with the grain storage bin ventilator which is the subject of this invention, portions of the grain storage bin being broken away and shown in section in order to clearly illustrate the relationship of the grain storage bin ventilator with respect thereto;

Figure 2 is an enlarged perspective view of the grain storage bin ventilator of Figure 1;

Figure 3 is an enlarged vertical sectional view taken through the center of the grain storage bin ventilator of Figure 2 and shows the specific details of the construction thereof, an intermediate portion of a bin being omitted;

Figure 4 is an enlarged transverse horizontal sectional view taken substantially upon the plane indicated by the section line 4—4 of Figure 3 and shows the details of a support bracket which is an essential feature of the ventilator; and Figure 5 is an enlarged transverse horizontal sectional view taken substantially upon the plane indicated by the section line 5—5 of Figure 3 and shows the relationship of the fan blades of the ventilator with respect to the vent tube.

Referring now to the drawings in detail, it will be seen that there is illustrated in Figure 1 a conventional grain storage bin which is referred to in general by the reference numeral 10. The storage bin 10 includes a cylindrical main portion 12 which is seated on a base 14. The upper end of the main portion 12 is closed by a generally conical roof 16. The roof 16 has an opening 18 in the top thereof which is surmounted by a reinforcing sleeve 19 over which is normally carried a removable lid 20.

Carried by the bin lid 20 with the bin lid 20 forming a part thereof is the grain storage bin ventilator which is the subject of this invention, the ventilator being referred to in general by the reference numeral 22. It will be noted that the bin lid 20 includes an annular top portion 24 which has depending therefrom at the periphery thereof a cylindrical portion 26. The cylindrical portion 26 is intended to be received over the sleeve 19, while the part of the annular top portion 23 projecting inwardly of the cylindrical portion 26 overlies and rests upon the upper edge of the roof 16 and the sleeve 19 to retain the bin lid 20 in place.

Rigidly secured to an inner edge of the annular top portion 24 and extending upwardly therefrom is a tubular portion 28 of the bin lid 20. The tubular portion 28 is braced by circumferentially spaced diagonal braces 30 which have their upper ends secured to upper parts of the tubular portion 28 and to outer parts of the annular top portion 24.

Carried by the tubular portion 28 and disposed therein is a support bracket which is referred to in general by the reference numeral 32. The support bracket 32 includes a pair of upper generally U-shaped support members 34 which are disposed in a common horizontal plane. The support members 34 each include a web 36 and diverging flanges 38. The flanges 38 are terminally secured to the inner surface of the tubular portion 28 while the webs 36 are disposed in back to back relation. Carried by the webs 36 at mid-points thereof is an upper bearing assembly 40.

The support bracket 32 also includes a pair of depending support members 42. The support members 42 have their upper ends secured to the support members 34 at the ends of their webs 36, as is best illustrated in Figure 4. The support members 42 depend below the support members 34 and have secured to the lower ends thereof a lower bearing assembly 44. The lower bearing assembly 44 is vertically aligned with the upper bearing assembly 40.

Rotatably journalled in the upper bearing assembly 40 and the lower bearing assembly 44 is the drive shaft 46. It will be understood that the drive shaft 46 is carried by the bearing assemblies 40 and 44 for not only rotation but is also vertically supported thereby.

Overlying the upper end of the tubular portion 28 and closing the same is a wind turbine which is referred to in general by the reference numeral 48. The wind turbine 48 is of a conventional type and includes a plurality of vanes 50 which are secured at their upper ends to a circular plate 52. The lower ends of the vanes 50 are secured to a depending sleeve 54. The sleeve 54 guidingly engages the upper part of the tubular portion 28 while the circular plate 52 is rigidly secured to the upper end of the drive shaft 46 as at 56.

Surrounding the lower portion of the drive shaft 46 is a vent tube 58. It is to be understood that the vent tube 58 is of a length so that it will substantially reach the bottom of the grain storage bin 10, as is best illustrated in Figure 1. The vent tube 58 is supported by the bin lid 20 and has the upper portion thereof seated within and secured to the lower part of the tubular portion 28, as is best illustrated in Figure 3.

In order that grain stored in the grain storage bin 10 may be properly ventilated, the lower portion of the vent tube 58 is provided with a plurality of perforations 60 so that air may be drawn thereinto through the surrounding grain.

In order that air may be drawn into the vent tube 58 through the perforations 60, the lower portion of the drive shaft 46 is in the form of a fan device and includes a plurality of blades 62. The blades 62 are so arranged so as to draw air up through the vent tube 58 in response to rotation of the drive shaft 46.

In order that warm moist air may also be drawn out of the upper portion of the grain storage bin 10, especially that in the vicinity of the roof 16, the extreme upper portion of the vent tube 58 is provided with circumferentially spaced louvers 64 which project inwardly to facilitate the flow of air from exteriorly of the vent tube 58 thereinto.

Inasmuch as the bearing assemblies 40 and 44 may be of the sealed type, and since the entire ventilator is motivated by the wind turbine 48, it will be seen that the grain storage bin ventilator 22 need not be controlled nor does it require maintenance. Further, since all motivating power is furnished by the wind, it will be seen that there is no operating cost for the ventilator. Further, inasmuch as the wind generally blows both night and day, it will be seen that while the operation of the ventilator 22 may be intermittent, it does extend over a 24 hour period every day so as to properly ventilate grain which may be disposed in an associated grain storage bin 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A grain storage bin ventilator comprising an annular bin lid, a tubular portion rising coaxially from said lid, a vent tube fixed to and depending axially from said tubular portion and provided with a perforated air inlet lower end for positioning in the bottom of a bin, a skeleton bearing bracket fixed in said tubular portion and having members depending into said vent tube, a bearing carried by said members in the vent tube, a shaft depending through said tubular portion into said vent tube and rotatably mounted in said bracket and said bearing, a wind turbine fast on said shaft above said tubular portion for driving the shaft, a spiral suction blade on said shaft between said bearing and the perforated air inlet end portion of said vent tube for drawing air upwardly in said vent tube through said perforated air inlet lower end and out of the lower portion of a bin, said vent tube having inwardly projecting louvers in its upper portion above said blade for causing circulation of air through the upper portion of a bin under the action of said blade.

References Cited in the file of this patent

UNITED STATES PATENTS

| | | |
|---|---|---|
| 209,552 | Demond | Nov. 5, 1878 |
| 509,141 | Siegert | Nov. 21, 1893 |
| 1,317,309 | Overholt | Sept. 30, 1919 |
| 1,977,391 | Kramer | Oct. 16, 1934 |

FOREIGN PATENTS

| | | |
|---|---|---|
| 2,304 | Great Britain | June 10, 1879 |
| 2,356 | Great Britain | Aug. 8, 1872 |
| 4,386 | Great Britain | Oct. 27, 1880 |
| 6,056 | Austria | Dec. 10, 1901 |